United States Patent Office 3,541,109
Patented Nov. 17, 1970

3,541,109
1-SUBSTITUTED IMIDAZOLES USEFUL IN ACTH RESERVE ASSAY
James C. Kauer, Wilmington, Del., assignor to E. I. du Pont de Nemours and Company, Wilmington, Del., a corporation of Delaware
No Drawing. Continuation-in-part of application Ser. No. 620,666, Mar. 6, 1967. This application June 25, 1968, Ser. No. 739,644
Int. Cl. C07d *49/36*
U.S. Cl. 260—309    8 Claims

ABSTRACT OF THE DISCLOSURE

Described and claimed are 1-substituted imidazoles, e.g., 1-(2-cyano- or 1-(2-nitro-4-fluorophenyl)-imidazole, useful as ultraviolet screening agents and in the form of picrates, as dyes. The compounds also have biological utility, particularly in ACTH (adrenocorticotrophin) reserve assay.

RELATED APPLICATION

This application is a continuation-in-part of my copending application, Ser. No. 620,666, filed Mar. 6, 1967.

FIELD OF THE INVENTION

This invention relates to, and has as its principal objects provision of, selected 1-(substituted aromatic)imidazoles particularly useful biologically in warm-blooded animals as inhibitors of steroid hydroxylation of the adrenal cortex, i.e., in ACTH reserve assay.

BACKGROUND OF THE INVENTION

The anterior pituitary gland secretes important hormones, one of which is the adrenocorticotrophic factor, designated as ACTH. This proteinaceous substance acts upon the adrenal cortex. Adrenal insufficiency (Addison's disease) of hyperfunction (Cushing's disease) are due to disorders of the adrenal cortex. Another malfunction is in salt-retaining hormone production and electrolyte-water balance (e.g., through conversion of desoxycorticosterone to aldosterone—an 11β-hydroxylation). Adaptation to stresses are due, at least in part, to adrenal hormone. It has been proven than ACTH mediates hydroxylation of 11β-, 18- and 21-positions of steroids, e.g., conversion of progesterone to hydrocortisone.

Diagnostic aids to determine adrenocorticotrophic ability have been sought for some time. There is, in fact, a particular need for compounds useful to test pituitary function that are less toxic than compounds available. Such materials would not only be useful for regulation of corticoid dosage, but possibly also useful for the control of hypertension and electrolyte balance.

In accordance with the present invention, it has been found that certain novel imidazoles are good diagnostic aids for ACTH reserve assay, i.e., for testing pituitary function. In contrast, although many imidazoles have been reported in the literature, some closely related to those of this invention, no such diagnostic ability has been mentioned for any of them.

DESCRIPTION OF THE INVENTION

The compounds of this invention have the formula

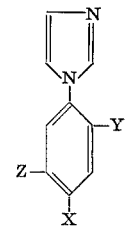

wherein Y is $NO_2$, CN, COOH, COOR, $CONR_2$, $COCH_3$, or CHO and X is H, R, $OCH_3$, F, Cl, Br, or $CF_3$, or, conjointly with Z, —CH=CH—CH=CH—, R in both Y and X being H or lower alkyl, i.e., alkyl of 1–4 carbons; and Z is H or, conjointly with X,

—CH=CH—CH=CH—

The preferred compounds are the 1-(2-nitro- or cyanophenyl)imidazoles having halogen in the 4-position of the benzenoid ring.

The compounds of this invention can be prepared by various methods. In one method, the 1-aryl substituted imidazoles can be made by an arylation of imidazole with a 2-substituted halobenzene according to the equation:

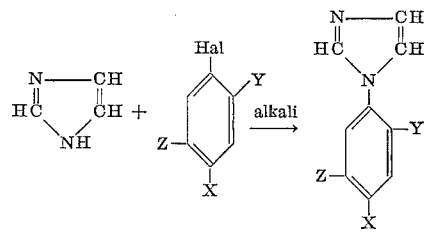

wherein Hal is iodine, bromine, chlorine or fluorine (preferably fluorine) and X, Y and Z are as above.

The optimum temperature and time for the reaction depends upon the reactivity of the aryl halide used but are generally between 50° and 150° C. and 1–100 hours. Aryl fluorides are more reactive than aryl chlorides, which in turn are more reactive than aryl bromides. Electron withdrawing substituents (e.g., CN, $NO_2$) in the ortho- and para-positions to the halogen increase the ease of its replacement while electron donor groups such as methyl decrease the activity of the halogen and need increased times and/or temperatures for the reaction. In many cases, copper or its compounds enhances the reaction and frequently gives a more readily purified product. The alkali is generally $Na_2CO_3$ although $K_2CO_3$, $Na_3PO_4$, $Ca(OH)_2$ and alkaline ion-exchange resins can be used. Dimethylformamide and dimethylsulfoxide are useful solvents.

Compounds of the invention can also be prepared by ring closure of a substituted aromatic acetalylthiourea with hydrochloric acid followed by removal of the mercapto group with nitric acid according to the equations:

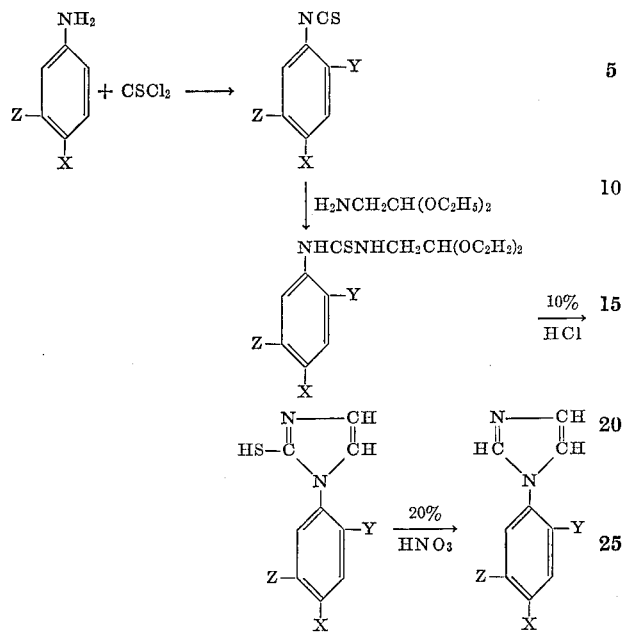

X, Y and Z being as above.

This process can be carried out sequentially without purification of intermediates such as the aryl acetalyl thiourea.

The latter process is more general than the direct reaction with aryl halides. The reaction conditions are generally from 0–100° C. for all of the reactions. Purification can be accomplished by the usual procedures, including filtration through absorption columns.

The compounds of this invention all absorb ultraviolet energy and are useful when applied as coatings, films, etc., to protect tsuch light-sensitive materials. They may be formulated with paints, resins, etc., to reduce deleterious effects of light on the latter. The compounds of the invention also react to form picrates which are useful as dies. The imidazoles exert buffering action and have additional utility as inhibitors of the polymerization of unsaturated monomers.

A peculiar and unexpected property of some of the new compounds of this invention as compared to previously obtained heterocycles of this general class is that they inhibit sperm production in the male without inhibition of male sex characteristics. For example, three weeks after a single does of a 1-(2'-nitroaryl)imidazole, the character of the sperm-producing and maturing tubules of a male rat is altered without alteration of the androgen production by the tests as determined by the appearance of the ventral prostate and seminal vesicles. Thus, the specific effect as a male anti-fertility agent does not inhibit endocrine function with undesirable hormonal side effects as are customarily obtained when steroidal compounds are administered.

These compounds, furthermore, are all in vitro and in vivo inhibitors of steroid hydroxylases, particularly $11\beta$, 18, and 21-hydroxylases. They are useful to diagnose and evaluate the functional status of hypothalmic-anterior pituitary-adrenal system, i.e., the adrenocorticotrophin reserve present.

EMBODIMENTS OF THE INVENTION

The following examples further illustrate the new compounds of this invention and their preparation. In the examples, temperatures are given in degrees centigrade, pressures are atmospheric, and NMR signals are expressed in parts per million downfield of tetramethylsilane.

EXAMPLE 1
1-(2-cyanophenyl)imidazole (X=Z=H, Y=CN)

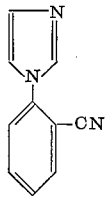

A mixture of 12 g. of o-fluorobenzonitrile, 7 g. of imidazole and 7 g. of sodium carbonate in 50 ml. of dimethylformamide was heated to 100° for 24 hours and heated to 120° for an additional 40 hours. The reaction product was poured into ice water, extracted by methylene chloride, the extract dried over MgSO₄ and the solvent evaporated. The solid was recrystallized twice from benzene to give 4.7 g. of white leaflets of 1-(2-cyanophenyl)imidazole, M.P. 146.8–147.4°.

*Analysis.*—Calcd. for $C_{10}H_7N_3$ (percent): C, 70.99; H, 4.17; N, 24.84. Found (percent): C, 70.52; H, 4.26; N, 25.42.

$$\lambda_{max.}^{CH_3CN}\ 285\ m\mu\ (\epsilon\ 2110)$$

NMR (CDCl₃ complex multiplet δ=7.80–7.17 (imidazole and benzenoid aromatic protons)).

EXAMPLE 2
1(2-nitro-4-fluorophenyl)imidazole
(X=F, Y=NO₂, Z=H)

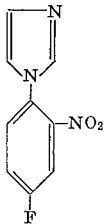

A mixture of 24 g. of 2,5-difluoronitrobenzene, 15 g. of sodium carbonate and 10.5 g. of imidazole in 100 ml. of dimethylformamide was stirred while being heated at 100° for 24 hours. The resulting mixture was poured on ice, the product extracted with methylene chloride and the extract washed with water. The methylene chloride solution was dried over MgSO₄ and evaporated to give orange crystals. These were recrystallized first from a benzene/hexane mixture and then from CCl₄ to give about 9 g. of 1-(2-nitro-4-fluorophenyl)imidazole, M.P. 84.8–85.7°.

*Analysis.*—Calcd. for $C_9H_6FN_3O_2$ (percent): C, 52.18; H, 2.92; F, 9.17; N, 20.28. Found (percent): C, 52.03; H, 2.68; F, 9.11; N, 20.17.

$$\lambda_{max.}^{C_2H_5OH}\ 290\ m\mu\ (\epsilon\ 1620)$$
$$250\ m\mu\ (\epsilon\ 4800)$$

EXAMPLE 3
1-(3-nitro-2-naphthyl)imidazole
(X+Z=—CH=CH—CH=CH—, Y=NO₂)

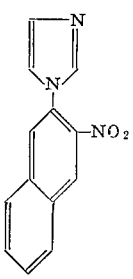

A mixture of 16.4 g. of 3-bromo-2-nitronophthalene, 5 g. of imidazole, 75 ml. of dimethylformamide and 8 g. of sodium, 0.5 g. of potassium iodide added and heated for about 3 days at 80°, 0.5 g. of potassium iodide added and heated at 100° for 20 hours and then 0.5 g. of copper powder added with heating continued for 20 hours. Infrared analysis indicated that a reaction occurred. The mixture was poured into ice water and extracted by methylene chloride and the extract evaporated. The residue was extracted with 10% hydrochloric acid and filtered. Potassium bicarbonate was added to the filtrate, and the latter was extracted by methylene chloride. The extract was dried over MgSO₄, evaporated and the 1-(3-nitro-2-naphthyl)imidazole (1.85 g.) recrystallized from benzene to give the purified compound, M.P. 180–181.2°.

*Analysis.*—Calcd. for $C_{13}H_9N_3O_2$ (percent): C, 65.26; H, 3.79; N, 17.57. Found (percent): C, 65.65; H, 4.37; N, 17.77.

$\lambda_{max.}^{CH_3CN}$ 348 mµ (ε 2560)

257 mµ (ε 20500)

221 mµ (ε 42100)

EXAMPLE 4

1-(2-cyano-4-trifluoromethylphenyl)imidazole
(X=CF₃, Y=CN, Z=H)

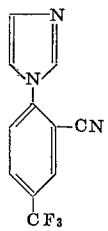

A mixture of 20.6 g. of 4-chloro-3-cyanobenzotrifluoride, 6.8 g. of imidazole and 11 g. of sodium carbonate in 60 ml. of dimethylformamide was stirred at 120° for 40 hours. The mixture was poured onto ice. The solid obtained was filtered and air dried. The product (25.7 g.) was dissolved in 100 ml. of hot benzene, treated with decolorizing charcoal and filtered. Hexane (250 ml.) was added, and an oil separated. After 4 days the brown oil solidified and white feathery crystals separated. The solidified oil contained 4-chloro-3-cyanobenzonitrile. The white crystals (9.3 g.) were recrystallized to give about 2 g. of 1-(2-cyano-4-trifluorophenyl)imidazole, M.P. 68–69°.

*Analysis.*—Calcd. for $C_{11}H_6F_3N_3$ (percent): C, 55.69; H, 2.55; N, 17.71. Found (percent): C, 54.84; H, 2.68; N, 17.77.

$\lambda_{max.}^{EtOH}$ 288 mµ (ε 2160)

$\nu_{max.}^{KBr}$ 2240 cm.⁻¹ (CN)

When the above procedure was repeated in the presence of potassium iodide and copper powder, a substantial increase in yield resulted.

EXAMPLE 5

1-(2-nitro-4-chlorophenyl)imidazole
(X=Cl, Y=NO₂, Z=H)

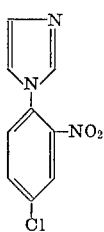

2-nitro-4-chloroaniline (51.75 g.) was reacted with a suspension of 37.3 g. of thiophosgene in 500 ml. of water over a 6-hour period to give 59 g. of 2-nitro-4-chlorophenylisothiocyanate. The latter was added to a solution of 39.8 g. of aminoacetal (i.e., 2-amino-1,1-diethoxyethane) in 400 ml. of ethanol. The mixture was refluxed for 30 minutes and the ethanol removed on a rotary evaporator. The dark oily residue was heated under reflux for 30 minutes with 400 ml. of 10% HCl. The orange solid obtained by cooling was filtered and recrystallized from ethanol to give 16.2 g. of brown crystalline 1-(2-nitro-4-chlorophenyl) - 2 - mercaptoimidazole, M.P. 188–192° dec. The latter product was stirred with 75 ml. of 20% HNO₃ on a steam bath until the brief violent reaction was over, and the reaction mixture filtered. The filtrate was then made basic with 75 ml. of 15% NH₄OH and cooled to 0°. Filtration gave 14 g. of 1-(2-nitro - 4 - chlorophenyl)imidazole. This was purified by dissolution in benzene and drying out the addition of hexane to give yellow crystals, M.P. 94–95°. The same product is obtained from 2,5-dichloronitrobenzene and imidazole by the process of Example 1. The latter product was crystallized from ethanol to give 1-(2-nitro-4-chlorophenyl)imidazole.

*Analysis.*—Calcd. for $C_9H_6N_3ClO_2$ (percent): C, 48.34; H, 2.71; N, 18.79. Found (percent): C, 48.30; H, 2.93; N, 18.81.

$\lambda_{max.}^{C_2H_5OH}$ 301mµ(ε1510)

215mµ(ε20,8000)

NMR (CDCl₃) coupling constant J is in cycles per second

δ=

8.00 (doublet J=2) one Cl—C—CH—C—NO₂ proton 7.75 (doublet J=9, each member split J=2) one CH=CH—CCl proton 7.64 (multiplet) one imidazole N=CH—N proton 7.42 (doublet J=9) one O₂NC—CH=CH proton 7.14 (doublet J=10) 2 imidazole CH=CH protons.

EXAMPLE 6

1-(2-cyano-4-fluorophenyl)imidazole
(X=F, Y=CN, Z=H)

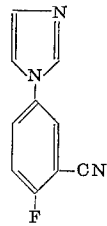

A mixture of 25 g. of 2,5-difluorobenzonitrile, 12.25 g. of imidazole, 19.8 g. of sodium carbonate in 108 ml. of dimethylformamide was heated at 120° for 40 hours. The mixture was poured onto ice, filtered and the residue washed with water. The product was dissolved in warm benzene, (100 ml.) dried over sodium sulfate, filtered, and 100 ml. hexane added to give 9.64 g. of 1-(2-cyano-4-fluorophenyl)imidazole, M.P. 132–134°, which was recrystallized again from benzene (50 ml.) and hexane (40 ml.), yield 8.8 g.

*Analysis.*—Calcd. for $C_{10}H_6FN_3$ (percent): C, 64.15; H, 3.22; N, 22.45. Found (percent): C, 63.80; H, 3.00; N, 23.14.

$\lambda_{max.}^{EtOH}$ 288 mµ(ε2420)

232 mµ(ε9900)

$\gamma_{max.}^{KBr}$ 2235 cm⁻¹(CN)

NMR (CDCl₃)

δ=

7.81 (multiplet) one N—CH—N proton 7.62–7.42 (complex multiplet) three benzenoid protons 7.32 (triplet, J=1.5), 7.25 (multiplet)—two CH=CH imidazole protons

EXAMPLE 7

1-(2-nitro-4-methylphenyl)imidazole
(X=CH₃, Y=NO₂, Z=H)

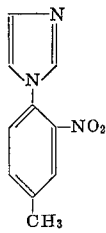

2-nitro-4-methylaniline (30.4 g.) was added with stirring to 24.9 g. of thiophosgene in 350 ml. of water. After two hours, the 2-nitro-4-methylphenylisothiocyanate was removed by filtration and air dried. To a solution of 26.6 g. of aminoacetal in 250 ml. of ethanol was added 38.8 g. of the preceding isothiocyanate and the mixture was refluxed for 30 minutes. The ethanol was removed by rotary evaporation and the orange residue heated with 10% HCl under reflux for 90 minutes. After cooling, the brown precipitate of 1-(2-nitro-4-methylphenyl)-2-mercaptoimidazole was filtered and recrystallized from ethanol, yield 26.0 g. of brown crystalline solid, M.P. 222–223.5°.

Analysis.—Calcd. for $C_{10}H_9N_3O_2S$ (percent): C, 51.06; H, 3.86; N, 17.87. Found (percent): C, 50.63; H, 3.80; N, 17.90.

To 22 g. of the preceding thiol was added 80 ml. of 20% HNO₃ with stirring and warming on a steam bath. After vigorous reaction, the mixture was filtered and the filtrate made basic with 15% NH₄OH. After cooling to 0°, the product was washed with ice water and filtered. The air-dried yellow powder (16.3 g.) was recrystallized from benzene with decolorizing charcoal treatment. There was obtained 4 g. of crystalline 1-(2-nitro-4-methylphenyl)imidazole, M.P. 79–81°.

Analysis.—Calcd. for $C_{10}H_9N_3O_2$ (percent): C, 59.10; H, 4.46; N, 20.68. Found (percent): C, 59.29; H, 4.45; N, 21.14.

$\lambda_{max.}^{EtOH}$ 300 mμ(ε1590)

260 mμ(4060)

NMR (CDCl₃)
δ=

7.83 (broad singlet) one N—CH—N proton
7.65–7.28 (multiplet) 3 benzenoid aromatic protons
7.19 (broad singlet), 7.07 (multiplet)—two CH=CH imidazole protons
2.51 (singlet) three CH₃ protons The same compound was also obtained by reaction of 4-chloro-3-nitrotoluene with imidazole according to procedures such as those described in Examples 1–4.

EXAMPLE 8

1-(2-nitro-4-bromophenyl)imidazole
(X=Br, Y=NO₂, Z=)H

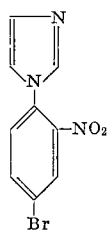

A mixture of 28.1 g. of 2,5-dibromonitrobenzene, 6.8 g. of imidazole, 60 ml. of dimethylformamide, 0.5 g. of potassium iodide, 0.5 g. of copper powder, and 11 g. of sodium carbonate was heated at 100° for 20 hours. The reaction mixture was added to ice, the solid filtered, and extracted with chloroform. The chloroform solution was filtered and extracted with three 50-ml. portions of 10% HCl. These extracts were made basic with 15% ammonium hydroxide and the product was extracted with three 50-ml. portions of chloroform. The latter solution was dried, filtered through Florisil® (20 g.) and eluted with 400 ml. of chloroform. Evaporation gave a yellow solid which was crystallized from hot benzene (10 ml.) to give 5.9 g. of yellow crystalline 1-(2-nitro-4-bromophenyl)imidazole, M.P. 119–120°.

Analysis.—Calcd. for $C_9H_6BrN_3O_2$ (percent): C, 40.32; H, 2.26; N, 15.67. Found (percent): C, 40.72; H, 2.38; N, 15.29.

$\nu_{max.}^{C_2H_5OH}$ 303 mμ(ε1590)

222 mμ(ε20,400)

NMR (CDCl₃)
δ=

8.23 (doublet J=2) one BrC—CH—C—NO₂ proton
7.95 (doublet J=9, each member split J=2) one BrCH=CH proton
7.69 (singlet) one N—CH—N proton
7.45 (doublet J=9) one N—C—CH—CHC—Br proton
7.18 (doublet J=10) 2 imidazole CH=CH protons

EXAMPLE 9

1-(2-nitro-4-methoxyphenyl)imidazole
(X=OCH₃, Y=NO₂, Z=H)

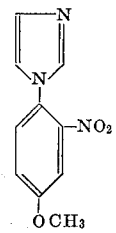

To a suspension of 24.9 g. of thiophosgene in 350 ml. of water was added with stirring 33.63 g. of 2-nitro-4-methoxyaniline. After 4 hours, the residue was filtered and washed with water. The isothiocyanate obtained was recrystallized from benzene to yield 16.1 g. of an orange solid, M.P. 71.5–74°. A total of 26.3 g. of the preceding (some obtained from a repetition) was added to 16.65 g. of aminoacetal in 200 ml. of ethanol, and the mixture was heated at reflux for 30 minutes. After stripping the ethanol, the residue was stirred with 200 ml. of 10% HCl and heated at reflux for 30 minutes. After cooling, the red crystalline product was filtered and extracted with alchohol. The brownish crystalline 1-(2-nitro-4-methoxyphenyl)-2-mercaptoimidazole (12.6 g., M.P. 228–229° dec.) was stirred with 50 ml. of 20% HNO₃ and heated on a steam bath. After the reaction, the solution was filtered and the filtrate made basic with 15% NH₄OH and cooled to 0°. The solid product was dissolved in 25 ml. of chloroform, dried over Na₂SO₄, and passed through a 30 g. column of Florisil®. The product was eluted with 500 ml. of chloroform. Evaporation gave a solid which was recrystallized from benzene (25 ml.), yielding 7.3 g. of 1-(2-nitro-4-methoxyphenyl)imidazole, M.P. 97–98°.

Analysis.—Calcd. for $C_{10}H_9N_3O_3$ (percent): C, 54.79; H, 4.14; N, 19.17. Found (percent): C, 54.77; H, 4.08; N, 19.26.

$\nu_{max.}^{C_2H_5OH}$ 320 mμ(ε1840)

219 mμ(ε19,600)

NMR (CDCl₃)
δ=

7.61–7.09 (complex multiplet) three benzenoid and three imidazole aromatic protons
3.95 (singlet) three OCH₃ protons

EXAMPLE 10

1-(2-carboxy-4-bromophenyl)imidazole
(X=Br, Y=COOH, Z=H)

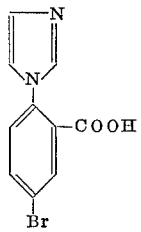

The following mixture was heated at 100° for 20 hours: 6.8 g. of imidazole, 60 ml. of dimethylformamide, 25 g. of 2,5-dibromobenzoic acid, 21.2 g. of sodium carbonate, 0.5 g. of potassium iodide and 0.5 g. of powdered copper. The reaction mixture was poured into ice water and acidified with conc. HCl. The precipitate was filtered and discarded. The mother liquors were adjusted to pH 6 by the addition of 50 g. of sodium acetate trihydrate and filtered again to give 27.7 g. of crude product. Two recrystallizations from ethanol (800 ml.) with treatment by decolorizing charcoal gave 5.8 g. of 1-(2-carboxy-4-bromophenyl)imidazole, M.P. 236–239°.

*Analysis.*—Calcd. for $C_{10}H_7BrO_2N_2$ (percent): C, 44.95; H, 2.64; N, 10.49. Found (percent): C, 45.23; H, 2.69; N, 10.49.

$\lambda_{max.}^{C_2H_5OH}$ 285 m$\mu$($\epsilon$1190)

$\gamma_{max.}^{Nujol}$ 1660 cm$^{-1}$($CO_2^-$)

NMR ($CF_3CO_2H$)
$\delta=$
- 8.35 (singlet) one $HO_2C$—C—CH—C—Br proton
- 8.12 (doublet, J=2) one N—CH—N proton
- 7.65 (doublet, J=8) one benzenoid aromatic proton
- 7.10 (multiplet) two imidazole and one benzenoid aromatic protons

EXAMPLE 11

1-(2-nitro-4-trifluoromethylphenyl)imidazole
(X=CF$_3$, Y=NO$_2$, Z=H)

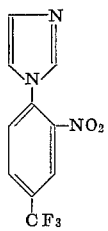

The general procedure of the preceding example was repeated except that 22.6 g. of 4-chloro-3-nitrobenzotrifluoride was substituted for the dibromobenzoic acid and 11.0 g. of sodium carbonate was employed. The reaction mixture was poured onto ice and the crude brown product was filtered, dissolved in 75 ml. of chloroform and passed through a Florisil® column (45 g.) with 700 ml. of chloroform as eluant. The eluate was dried over sodium sulfate. The residue obtained by evaporation of the chloroform solution was recrystallized from benzene (25 ml.) to give yellow needles of 1-(2-nitro-4-trifluoromethylphenyl)imidazole. After another recrystallization from benzene (8 ml.), 7 g. of the product was obtained, M.P. 93–95°.

*Analysis.* — Calcd. for $C_{10}H_6F_3N_3O_2$ (percent): C, 46.70; H, 2.35; N, 16.30. Found (percent): C, 46.51; H, 2.40; N, 16.39.

$\lambda_{max.}^{C_2H_5OH}$ 290 m$\mu$ ($\epsilon$ 1465)

245 m$\mu$ ($\epsilon$ 6660)

NMR (CDCl$_3$)
$\delta=$
- 8.25 (broad singlet) one CF$_3$C—CH—C—NO$_2$ proton
- 8.03 (doublet J=8, each member split J=2 cps.) one CF$_3$CH—CH proton
- 7.65 (doublet, J=8) one N—CH—CHCF$_3$ proton
- 7.65 (singlet) one N—CH—N proton
- 7.13 (doublet, J=6) two CH=CH imidazole protons

EXAMPLE 12

1-(2-carbamylphenyl)imidazole
(X=Z=H, Y=CONH$_2$)

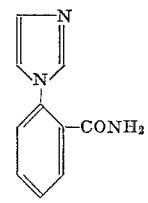

1-(2-cyanophenyl)imidazole (22.5 g., see Example 1) was dissolved in 120 ml. of conc. H$_2$SO$_4$ and heated on a steam bath for 10 minutes. After cooling, the mixture was added to 500 ml. of water, cooled, made basic (pH 8) with 28% NH$_4$OH and cooled again to 0°. The yellow crystals obtained were filtered and recrystallized from water (120 ml.) with decolorizing charcoal treatment to yield 21.2 g. of 1-(2-carbamylphenyl)imidazole, M.P. 177.5–178.5°.

*Analysis.*—Calcd. for $C_{10}H_9N_3O$ (percent): C, 64.16; H, 4.85; N, 22.45. Found (percent): C, 63.63; H, 4.86; N, 22.76.

$\lambda_{max.}^{C_2H_5OH}$ 265 m$\mu$ ($\epsilon$782)

$\gamma_{max.}^{KBr}$ 3390, 3180, 1665, 1630 cm.$^{-1}$ (CONH$_2$)

EXAMPLE 13

1-(2-carbamyl-4-fluorophenyl)imidazole
(X=F, Y=CONH$_2$, Z=H)

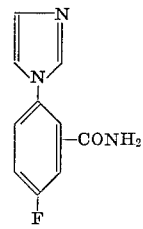

A total of 1.59 g. of 1-(2-cyano-4-fluorophenyl)-imidazole was stirred with 8 ml. of conc. H$_2$SO$_4$ according to the procedure of Example 12. After the addition of NH$_4$OH and two crystallizations from water with decolorizing charcoal treatment, there was obtained 0.4 g. of 1-(2-carbamyl-4-fluorophenyl)imidazole, M.P. 146–147°.

*Analysis.*—Calcd. for $C_{10}H_8FN_3O$ (percent): C, 58.52; H, 3.93; N, 20.47. Found (percent): C, 56.88; H, 3.98; N, 21.05.

$\nu_{max.}^{KBr}$ 3400, 3325, 3200, 1670, 1630 cm.$^{-1}$ (CONH$_2$)

$\lambda_{max.}^{H_2O}$ 271 m$\mu$ ($\epsilon$1240)

NMR (D$_2$O+10% CF$_3$CO$_2$H)
$\delta=$
- 8.98 (triplet J=1) one N—CH—N proton
- 7.64 (multiplet), 7.61 (multiplet) 2 CH=CH imidazole +2 benzenoid aromatic protons
- 7.46 (singlet) one H$_2$NCOC—CH—C—F proton

EXAMPLE 14

1-(2-carbamyl-4-trifluoromethylphenyl)-imidazole
($X=CF_3$, $Y=CONH_2$, $Z=H$)

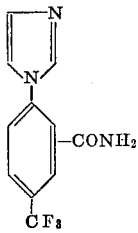

1-(2-cyano-4-trifluoromethylphenyl)imidazole (25.0 g., see Example 4) was treated with 125 ml. of conc. $H_2SO_4$ according to the procedure of Example 12. The crude material obtained was recrystallized from a mixture of water (100 ml.) and ethanol (50 ml.) with decolorizing charcoal treatment to yield 22.8 g. of white crystalline 1-(2-carbamyl-4-trifluoromethylphenyl)imidazole, M.P. 192–193.5°.

*Analysis.*—Calc. for $C_{11}H_8F_3N_3O$ (percent): C, 51.77; H, 3.16; N, 16.46. Found (percent): C, 51.06; H, 3.01; N, 16.59.

$\nu_{max.}^{KBr}$ 3305, 1680, 1640 cm.$^{-1}$ ($CONH_2$)

$\lambda_{max.}^{C_2H_5OH}$ 250 m$\mu$ ($\epsilon$3800)

NMR ($D_2O+CF_3CO_2H$)
$\delta=$
8.05 (triplet J=1) one N—CH—N proton
7.10 (singlet) one $CF_3$—C—CH—C—$CONH_2$ proton
6.90 (quater, J=7) two benzenoid aromatic protons
6.67 (doublet J=1) two imidazole CH=CH protons

EXAMPLE 15

1-(2-formylphenyl)imidazole
($X=Z=H$, $Y=CHO$)

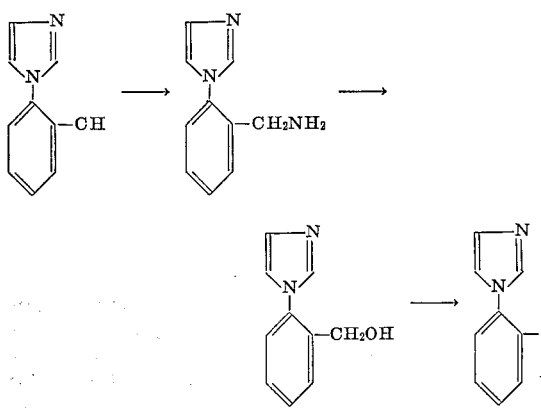

(A) 1-(2-aminomethylphenyl)imidazole.—To a slurry of 8 g. of lithium aluminum hydride in 100 ml. of tetrahydrofuran was added slowly a mixture of 16.9 g. of 1-(2-cyanophenyl)-imidazole in 225 ml. of tetrahydrofuran. The mixture was stirred overnight at 25°. It was then heated under reflux for 2 hours, cooled and treated with 50 ml. of 10° HCl, acidified with conc. HCl, and tetrahydrofuran removed therefrom by evaporation. The aqueous mixture was extracted with 50 ml. of chloroform, and the extract was discarded. The aqueous mixture was made basic with ammonia and extracted with two 100 ml. portions of chloroform. Removal of the solvent from the dried extract gave a red oil which was sublimed at 80–105° (0.1 mm.). Resublimation at 85° (0.1 mm.) gave 3.2 g. of 1-(2-aminomethylphenyl)imidazole, M.P. 49.5–52°, as an unstable white solid.

*Analysis.*—Calcd. for $C_{10}H_{11}N_3$ (percent): C, 69.34; H, 6.40; N, 24.26. Found (percent): C, 68.25; H, 6.18; N, 24.36.

$\gamma_{max.}^{KBr}$ 3370, 3275 cm.$^{-1}$ ($NH_2$)

$\lambda_{max.}^{C_2H_5OH}$ 268 m$\mu$ ($\epsilon$263)

262 m$\mu$ ($\epsilon$389)

NMR ($CDCl_3$)
$\delta=$
7.71 (doublet J=1) one N—CH—N proton
7.55–7.31 (multiplet) four benzenoid aromatic protons
7.22 (doublet J=1) two CH=CH imidazole protons
3.72 (singlet) two $CH_2$ protons
1.41 (singlet) two exchangeable $NH_2$ protons (B) 1-(2'-hydroxymethylphenyl)imidazole.—A solution of 1-(2-aminomethylphenyl)imidazole (1.73 g.) in water (10 ml.) and glacial acetic acid (1.0 ml.) was cooled to 0° and treated with a solution of sodium nitrite (1.7 g.) in water (10 ml.). After being stirred for one hour, the mixture was extracted with three 10-ml. portions of chloroform. The dried extracts were evaporated to leave a solid which was sublimed twice at 135° (0.2 mm.). The white crystalline product was 1-(2'-hydroxymethylphenyl)imidazole, M.P. 100.5–102.5°.

*Analysis.*—Calcd. for $C_{10}H_{10}N_2O$ (percent): C, 68.95; H, 5.79; N, 16.08. Found (percent): C, 68.74; H, 5.86; N, 16.25.

$\gamma_{max.}^{KBr}$ 3165, 3100 cm.$^{-1}$ (OH)

$\lambda_{max.}^{C_2H_5OH}$ 267 m$\mu$ ($\epsilon$256)

NMR ($CDCl_3$)
$\delta=$
7.66 (singlet) one N—CH—N proton
7.80–7.24 (complex multiplet) four benzenoid aromatic protons
7.10 (doublet, J=6) two CH=CH imidazole protons
6.09 (singlet) one exchangeable OH proton
4.47 (singlet) two $CH_2$ protons (C) 1-(2-formphenyl)imidazole.—Sarett reagent (0.5 g. of $CrO_3$ in 2 ml. of pyridine) was added to a solution of 1-(2-hydroxymethylphenyl)imidazole (0.5 g.) in pyridine (3 ml.). After 1.5 hour, the mixture was poured into 25 ml. of water and extracted with three 5-ml. portions of chloroform. Evaporation of the dried extracts left an oil which was warmed with 5 ml. of methanol and treated with 2,4-dinitrophenylhydrazine (0.5 g. in 20 ml. of acidified methanol). The orange crystalline product (0.33 g.), M.P. 259–261° dec., is the 2,4-dinitrophenylhydrazone of 1-(2-formylphenyl)imidazole.

EXAMPLE 16

1-(o-nitrophenyl)imidazole or 1-(2-nitrophenyl) imidazole ($X=Z=H$, $Y=NO_2$)

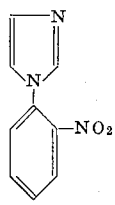

A mixture of 6.81 g. of imidazole, 14.2 g. of o-fluoronitrobenzene, 45 ml. of N,N-dimethylformamide and 10.6 g. of sodium carbonate was stirred and heated at reflux overnight. The resulting mixture was poured on ice and filtered to yield 14.13 g. of an orange solid product. Recrystallization from methylene chloride-hexane mixture at 5° produced 11.5 g. of 1-(o-nitrophenyl)imidazole. A portion recrystallized for analysis (from methylene chloride-hexane) melted at 94.7–97.2°.

*Analysis.*—Calcd. for $C_9H_7N_3O_2$ (percent): C, 57.14; H, 3.73; N, 22.21. Found (percent): C, 57.29; H, 3.95; N, 22.41, 22.52.

$$\lambda^{278}_{365} \, m\mu \, (\epsilon \, 1870)$$
$$\lambda^{365} \, m\mu \, (3 \, 189)$$

The compound exhibited absorption peaks in the infrared at 3110, 3060, 1615, 1595, 1530, 1515, 1455, 1360, 1305, 1265, 1252, 1115, 1098, 1061, 1040, 965, 909, 853, 844, 789, 751, 740, 707, and 658 cm.$^{-1}$.

As noted above, the compounds of this invention have various utilities. All the compounds absorb in the 265–350 m$\mu$ range and are ultraviolet absorbers.

Some of the compounds are effective male antifertility agents for warm-blooded animals. Thus, compounds were tested for anti-testis activity by giving intact adult male rats a single oral dose of compound suspended in an aqueous vehicle in a volume of 1.0 ml. per 100 g. of body weight. Control rats received vehicle only. Three weeks after treatment, the rats were weighed and necropsied. The epididymides, testes, ventral prostate and sometimes the seminal vesicles were examined for evidence of gross changes.

Testis weight decrease and/or gross changes in the seminiferous tubules or epididymal ducts indicate an antifertility effect. (From experience, it is believed that a testis weight decrease of 50% indicates maximal activity.) Decrease in size of ventral prostate and seminal vesicles indicates a decrease in androgen production by the non-seminiferous portion of the testis. An ideal male antifertility agent would inhibit sperm production or maturation only, without any effect on testis androgen production.

The compounds of this invention caused a dose-related decrease in testis weight compared to the testes of control rats. There were gross changes in the seminiferous tubules and epididymal ducts, but no changes were observed in the ventral prostate and seminal vesicles. Specific information is given in the following Table I, the first compound of which is included in the scope of the present invention but the last (inactive or undesirable) four of which are not:

used as starting material. Actual examples are tabulated below.

| Imidazole | Picrate Percent yield | M.P., ° |
|---|---|---|
| [imidazole-N-(o-nitrophenyl)-C$_6$H$_4$-CF$_3$] | 92 | 184–189 |
| [imidazole-N-(o-nitrophenyl)-C$_6$H$_4$-CH$_3$] | 91 | 152–154 |
| [imidazole-N-C$_6$H$_5$] | 95 | 123–124 |
| [imidazole-N-(o-CONH$_2$-phenyl)-C$_6$H$_4$-CF$_3$] | 87 | 198–200 |

The following procedure was used to dye various fibers various shades of yellow: Swatches of cloth samples were immersed in solutions consisting of 10 mg. of a particular picrate and 100 ml. of water and held at 80° for 1 hour. After rinsing with cold water, the stability of the dyed fibers towards soap was tested by washing with aqueous Ivory® soap solution and rinsing again in cold water. The particular shade and intensity of the dye depends upon the fiber chosen, the particular imidazole picrate and the dyeing conditions. For example, under the above conditions, Acrilan®, Creslan®, silk and Zefran® are dyed medium yellow and nylon and wool are dyed deep yellow.

The compounds are useful in the assay of ACTH reserve, i.e., they are in vitro and in vivo inhibitors of steroid hydroxylases, particularly 11$\beta$, 18- and 21-hydroxylases. They are useful to diagnose and evaluate the functional status of the hypothalamic anterior pituitary-adrenocortical axis using the method disclosed by Liddle et al., J. Clin. Endocr. 19:875 (1959).

TABLE 1.—ANTI-TESTIS ACTIVITY OF A COMPOUND OF THIS INVENTION VERSUS OTHER SELECTED COMPOUNDS

| Compound | Example | Dose, mg./kg. | Percent decrease in testis weight | Change [1] in Epididymal ducts | Vent. prostate |
|---|---|---|---|---|---|
| 1-(o-Nitrophenyl)imidazole | 1 | 150 | 20 | 1.0 | 0.0 |
| 1-(o-Nitrophenyl)-1,2,3-triazole | | 50 [2] 150 | 5 | 0.33 | 0.0 |
| 1-(p-Nitrophenyl)-1,2,4-triazole | | 150 | 3 | 0.0 | 0.0 |
| 1-(p-Nitrophenyl)tetrazole | | 150 | 3 | 0.0 | 0.0 |
| 1-phenyltetrazole | | 150 | 3 | 0.0 | 0.0 |

[1] On a rating scale of 2.0=grossly abnormal, 1.0=somewhat abnormal, 0.0=normal.
[2] All rats died.

All the compounds of the invention, in the form of the picrate, are useful as dyes. Yellow crystalline picrates of 1-arylimidazoles are prepared in high yield by mixing equimolar amounts of picric acid and the imidazole in sufficient hot ethanol to effect solution of the reactants. The product picrates, which are distinct chemical compounds from either of the reactants, are isolated by crystallization from ethanol. The particular yellow shade of the product depends upon the structure of the imidazole In general, the procedure utilized for evaluating the activity of the compounds is as follows:

(1) Bovine adrenal glands are obtained from slaughterhouse material;

(2) Enzyme preparations are obtained from the glands; and (3) Samples of the enzymes preparations, incubated, and the rate of hydroxylation determined.

The following procedure demonstrates in detail the method of obtaining activity for hydroxylation inhibition:

ENZYME PREPARATION

Bovine adrenal glands were collected as soon as possible after slaughter, freed from connective tissues and adhering fat, and placed in Dry Ice. The frozen glands were stored at −20° and processed within 48 hours.

The following operations were carried out in a cold room at 4°. The cortex was removed while still frozen and was homogenized with three times its weight of ice-cold 0.25 M sucrose solution first in a Waring Blendor at ¼ speed for 2 minutes and then in a Potter-Elvehjem homogenizer. The homogenate was centrifuged at 700×g for 15 minutes to obtain the mitochondrial fraction. This was followed by centrifugation of the supernatant fluid at 105,000×g for 60 minutes to sediment the microsomes.

The mitochondia and the microsomal pellets were resuspended in three times their weight of distilled water and lyophilized. The freeze-dried preparation was stored at −20° under desiccation.

The mitochondrial preparation was used for studying steroid 11β-hydroxylation of 11-deoxycorticosterone and the microsomal fraction for C-21 hydroxylation of progesterone and pregnenolone in vitro.

INCUBATION

All incubations were carried out in 20 ml. beakers at 37° in air, with shaking in a Dubnoff Metabolic Incubator. The incubation beakers contained, besides substrate and enzyme, the following additions: 3.5 μmoles of TPN (triphosphopyridine nucleotide); 22 μmoles of glucose-6-p; 1 Kornberg unit of glucose-6-P dehydrogenase; 5 μmoles of MgCl$_2$; 200 μmoles of tris buffer [i.e., tris(hydroxymethylamino)methane] at pH 7.4 in a total volume of 4 or 5 ml. The substrate was added to the beakers in 0.05 ml. of propane-1,2-diol before other additions.

After incubation, the steroids were extracted with 45 ml. of methylene chloride and centrifuged at 0° for 10 minutes, and the lower layer was quantitatively transferred to another tube and evaporated under nitrogen. The extracted steroids were dissolved in a definite volume of methylene chloride and suitable aliquots were taken for the estimation of products.

ASSAY

To determine the effect of added compounds on steroid 11β-hydroxylation, 11-deoxycorticosterone was the substrate. The product, corticosterone, was estimated fluorometrically (Moncloa, et al., Endocrinology, 65, 717 [1959]) as described below:

Aliquots of the sample corresponding to about 0.2, 0.4, 0.6, 1.0 and 2.5 μg. of corticosterone were taken in thick-wall, glass-stoppered tubes with a capacity of 10–11 ml. The solvent was blown off under a stream of nitrogen and the residue dissolved in 2 ml. of 13% ethanol. Each sample was washed with 5 ml. of petroleum ether by shaking for one minute, centrifuging for 5 minutes and removing the upper layer by aspiration. The sample was next extracted with 4 ml. of dichloromethane and the aqueous phase was removed by aspiration. To the dichloromethane extract was added 1 ml. of ice-cold 0.1 N sodium hydroxide solution, the tube shaken for 15 seconds and centrifuged for 5 minutes and the sodium hydroxide layer was carefully removed. Three ml. of sulfuric acid reagent was then added and the tube was shaken vigorously for 1 minute and finally centrifuged for 5 minutes. The sulfuric acid phase was removed and its fluorescence was determined after 50 minutes in an Aminco Bowman Spectrophotofluorometer. For corticosterone, the monochromator for activation wave length was set at 470 mμ and that for recording the fluorescence at 515 mμ. With each set of observations, a five point curve for six samples (0.3 to 2.4 μg.) of corticosterone as the standard was established.

The following Table II compares the activity of a commercially available steroid hydroxylation inhibitor ("Metopirone") with the 1-substituted phenyl-imidazoles of the respective examples noted. The "Metopirone" has been given an activity of unity in the procedural details above.

TABLE II

| Example: | Activity |
| --- | --- |
| 1 | 1.0 |
| 2 | 1.0 |
| 4 | 0.25 |
| 5 | 0.32 |
| 7 | 0.36 |
| 8 | 0.1 |
| 9 | 0.25 |
| 10 | 0.05 |
| 11 | 0.05 |
| 12 | 0.05 |
| 13 | 0.05 |
| 16 | 0.30 |

The formula of "Metropirone" is:

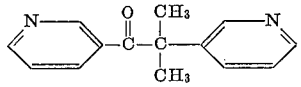

Although the compounds noted above can be used directly in pharmacology, salts such as the hydrochloride, nitrate, sulfate, phosphate and carboxylates, e.g., acetate, citrate, tartrate, etc., can likewise be employed. The salts are generally formed by a simple neutralization reaction between molecular equivalent amounts of the imidazole (which acts as a base) and an acid, preferably monobasic. For some purposes, use of the compounds in the form of pharmaceutically acceptable salts may be preferred because of their solubility in physiological fluids.

Since obvious modifications and equivalents in the invention will be evident to those skilled in the chemical arts, I propose to be bound solely by the appended claims.

The embodiments of the invention in which an exclusive property or privilage is claimed are defined as follows:

1. A compound of the formula

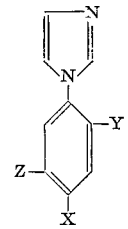

wherein: Y is NO$_2$, CN, or CONR$_2$ and X is R, OCH$_3$, F, Cl, Br or CF$_3$, or, conjoined with Z,

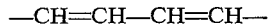

—CH=CH—CH=CH—

R being H or lower alkyl in both Y and X with the proviso that R is only lower alkyl in X when Y is NO$_2$; and Z is H or conjoined with X, —CH=CH—CH=CH—.

2. The compound of claim 1 wherein Y is CN and X and Z are hydrogen, 1-(2-cyanophenyl)imidazole.

3. The compound of claim 1 wherein Y is NO$_2$, X is F, and Z is hydrogen, 1-(2-nitro-4-fluorophenyl)imidazole.

4. The compound of claim 1 wherein Y is NO$_2$ and X and Z are, conjointly, —CH=CH—CH=CH—, 1-(3-nitro-2-naphthyl)imidazole.

5. The compound of claim 1 wherein Y is CN, X is CF$_3$ and Z is hydrogen, 1-(2-cyano-4-trifluoromethyl-phenyl)imidazole.

6. The compound of claim 1 wherein Y is NO$_2$, X is Cl and Z is hydrogen, 1-(2-nitro-4-chlorophenyl)imidazole.

7. The compound of claim 1 wherein Y is CN, X is

F and Z is hydrogen, 1-(2-cyano-4-fluorophenyl)imidazole.

8. The compound of claim 1 wherein Y is $NO_2$, X is $CH_3$ and Z is hydrogen, 1-(2-nitro-4-methylphenyl)imidazole.

References Cited

Chemical Abstracts Subject Index A–I, July–December 1967, vol. 67, page 460S (1968).

Forsyth et al.: Chem. Abst., vol. 24, p. 2747 (1930).

Merck Chem. Abst., vol. 63, columns 14867–8 (1965).

Miyazawa et al.: Chem. Abst., vol. 67, Abst. 89835e (1967).

Netherlands application 6405730, November 1964, p. 33 relied on.

Shirley et al.: Jour. Amer. Chem. Soc., vol. 79, pp. 4922–7 (1957).

Sitkina et al.: Chem. Abst., vol. 65, column 13,686 (Oct. 24, 1966).

Wilshire: Aust. J. Chem., vol. 20, pp. 1663–70 (August 1967).

Zahn et al.: Biochem. Zeit., vol. 330, pp. 97–106 (1958).

NATALIE TROUSOF, Primary Examiner

U.S. Cl. X.R.

8—1; 252—401; 260—45.8, 454, 552; 424—273